(12) United States Patent
Stählin

(10) Patent No.: US 8,554,469 B2
(45) Date of Patent: Oct. 8, 2013

(54) APPARATUS AND METHOD FOR UPDATING DIGITAL MAPS

(75) Inventor: Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 400 days.

(21) Appl. No.: 12/674,312

(22) PCT Filed: Apr. 14, 2008

(86) PCT No.: PCT/EP2008/054494
§ 371 (c)(1),
(2), (4) Date: Feb. 19, 2010

(87) PCT Pub. No.: WO2009/027120
PCT Pub. Date: Mar. 5, 2009

(65) Prior Publication Data
US 2011/0264361 A1    Oct. 27, 2011

(30) Foreign Application Priority Data

Aug. 25, 2007 (DE) .................. 10 2007 040 190
Feb. 27, 2008 (DE) .................. 10 2008 011 290

(51) Int. Cl.
G01C 21/00 (2006.01)
G08G 1/123 (2006.01)

(52) U.S. Cl.
USPC .................. 701/409; 340/995.1; 340/995.27

(58) Field of Classification Search
USPC .................. 701/400–541; 340/988–996
See application file for complete search history.

(56) References Cited

U.S. PATENT DOCUMENTS

| | | | |
|---|---|---|---|
| 6,292,745 B1 * | 9/2001 | Robare et al. | 701/409 |
| 6,643,584 B1 | 11/2003 | Ikeuchi et al. | |
| 6,937,936 B2 | 8/2005 | Nimura | |
| 6,980,907 B2 | 12/2005 | Umezu et al. | |
| 7,028,573 B2 | 4/2006 | Inaba et al. | |
| 7,419,095 B2 * | 9/2008 | Yoshioka et al. | 235/384 |
| 2005/0049784 A1 | 3/2005 | Ikeuchi et al. | |
| 2006/0092859 A1 * | 5/2006 | Choi et al. | 370/254 |
| 2006/0122768 A1 * | 6/2006 | Sumizawa et al. | 701/208 |
| 2006/0173614 A1 | 8/2006 | Nomura | |
| 2006/0293845 A1 | 12/2006 | Watanabe | |
| 2007/0126605 A1 * | 6/2007 | Aleksic et al. | 340/995.14 |
| 2008/0168109 A1 * | 7/2008 | Gaurav et al. | 707/203 |
| 2008/0208452 A1 | 8/2008 | Stocker | |

FOREIGN PATENT DOCUMENTS

| | | |
|---|---|---|
| DE | 10318615 A1 | 11/2003 |
| DE | 10318179 A1 | 3/2004 |
| DE | 10354850 A1 | 10/2004 |
| DE | 10337621 A1 | 4/2005 |
| DE | 102004040381 A1 | 5/2005 |
| DE | 102005053125 A1 | 5/2007 |
| EP | 1464922 A1 | 10/2004 |
| EP | 1715295 A1 | 10/2006 |
| EP | 1785968 A1 | 5/2007 |
| EP | 1916502 A1 | 4/2008 |
| WO | WO2005/019773 A1 | 3/2005 |

* cited by examiner

*Primary Examiner* — Muhammad Shafi
(74) *Attorney, Agent, or Firm* — RatnerPrestia

(57) ABSTRACT

A navigation unit for a vehicle for updating a navigation map is specified, wherein the navigation unit is configured to proactively ascertain a required portion of the map and is also configured to receive a restricted update for the map which relates to the required portion of the map.

12 Claims, 2 Drawing Sheets

APPARATUS AND METHOD FOR UPDATING DIGITAL MAPS

CROSS-REFERENCE TO RELATED APPLICATIONS

This application is the U.S. national phase application of PCT International Application No. PCT/EP2008/054494, filed Apr. 14, 2008, which claims priority to German Patent Application No. 10 2007 040 190.8, filed Aug. 25, 2007 and German Patent Application No. 10 2008 011 290.9, filed Feb. 27, 2008, the content of such applications being incorporated by reference herein.

FIELD OF THE INVENTION

The invention relates to the update of digital maps for vehicles. In particular, the invention relates to an update unit for a vehicle, an update system for a vehicle, a method for updating a digital map, a computer program product and a computer-readable medium.

BACKGROUND OF THE INVENTION

The rapid increase in vehicle traffic on the roads and the associated queues and travel time extensions are resulting in increased efforts worldwide to identify traffic states and to take them into account for the route selection or for route calculation in navigation systems.

If the geographical coordinates measured using a position-finding method are mapped directly to the coordinate system of a digital map, the true position of the object in the map may differ from the mapped position of the object in the map. The reason is firstly measurement errors in the position-finding method and secondly inaccuracies in the map. Since a navigation system needs to know the true position in the map, the map matching method aligns the measured position with the map information about the position and geometry of objects in the map, so that the most probable position of the object in the map is ascertained.

In vehicle navigation systems, the position of the vehicle is usually measured with the assistance of the satellite position-finding system GPS. The correctness of the measured and actual positions is specified at approximately 15 m in the case of GPS. Similarly, the digital map may have tolerances in the region of meters. For the navigation appliance, it is now necessary to ascertain the position of the vehicle in the digital map so that, by way of example, it is possible to determine a meaningful route calculation from the current location to the destination of travel. Without alignment of the measured position with the map information, the vehicle could find itself outside of the digitalized roads or on the wrong road in the map. Since the position of the vehicle in the digital map is critical for the navigation appliance, the measured position is aligned with the map information such that the most probable location of the vehicle in the map is ascertained for the navigation. In this regard, map matching involves utilizing the knowledge about the movements of the vehicle.

Digital maps are usually outdated as soon as they are delivered. For this reason, an update for the map is indispensible if the digital map is intended to correspond to the current circumstances. However, these updates comprise large volumes of data, since the whole map is always brought up to date.

SUMMARY OF THE INVENTION

It is an object of the invention to specify an improved update for a digital map for a vehicle.

The invention specifies an update unit for a vehicle for updating a digital map, an update system for a vehicle for updating a digital map, a method for updating a digital map for a vehicle, a computer program product and a computer-readable medium.

The exemplary embodiments described relate in equal measure to the update unit, the update system, the method, the computer program product and the computer-readable medium.

In line with one exemplary embodiment of the invention, an update unit for a vehicle for updating a navigation map is specified which has a map unit with a digital map for displaying a travel route on the map, wherein the update unit is designed to proactively ascertain an actually required portion of the map and wherein the update unit is also designed to receive a restricted update for the map which relates to the actually required portion of the map.

In other words, the update unit is able to show the current travel of the vehicle on the map at any time. The portion of the map which is actually required to be shown is ascertained proactively in this case by the update unit.

"Proactively" means that the update unit or the system control center takes an initiative at an early stage in order to clarify whether and, if appropriate, when the actually required portion of the map should be updated. Proactiveness within the context of the invention means action at an early stage, before the surroundings actually force the system to take (reactive) measures. In contrast, what is known as the "hybrid approach" involves deferred, reactive action.

In line with the invention, the map update is effected in a proactive manner, without this requiring a constant or at least regular network connection between the server and the update unit integrated in the vehicle, namely by virtue of the actually required portion of the map being ascertained proactively, possibly on the basis of a user intervention.

In this way, the volume of data interchanged between the server and the update unit can be reduced.

The map is updated only for those portions of the map which are actually used for travel or which are taken into account when planning a journey. By way of example, only this route is then brought up to date as often as possible by means of an update. There are various options which are used to estimate or ascertain the actually required portion of the map.

By way of example, the digital map is a digital navigation map. By way of example, the vehicle is a motor vehicle, such as a car, bus or heavy goods vehicle, or else a rail vehicle, a ship, an aircraft, such as a helicopter or airplane, or a bicycle.

In line with a further exemplary embodiment of the invention, the actually required portion of the map is ascertained on the basis of a user input.

By way of example, the driver is provided with the option of specifying his normal journey routes for the system before the start of the journey or else during the journey. These may be the normal commute from and to work, for example. The system checks this route at regular intervals for changes and then provides an update if appropriate. In line with a further exemplary embodiment of the invention, the actually required portion of the map is ascertained on the basis of detection of a traveled journey route.

This involves a piece of software, for example, recording the actually traveled routes and using these to produce a profile of the typical area of movement of the vehicle (movement profile). This area is checked for updates by the system, said updates being provided if appropriate.

In line with a further exemplary embodiment of the invention, the update unit has a communication unit for communication with a system control center.

The system control center stores the complete, up-to-date map. Portions of this map can then be transmitted to the update unit in the vehicle when retrieved or else on the initiative of the system control center.

In line with a further exemplary embodiment of the invention, the update unit is designed to retrieve the restricted update from the system control center. When the driver inputs a new travel route into the navigation unit, for example, a request can be transmitted to the system control center. The system control center then checks whether an update is necessary. The update can also occur at regular intervals.

The new travel route can firstly be input in the vehicle. Secondly, it is also possible for said input to be made at home on a computer, for example, which then communicates with the system control center. The update can be performed via a wireless network connection between the system control center and the navigation unit. By way of example, the transmission protocol is based on GSM, UMTS, WLAN or WiMax. The update can also be performed by means of an e-mail with a file attachment or a personalized web page with a download option. It is then possible for the data to be transmitted from the PC, for example, to the navigation unit using a mobile storage medium, such as a memory stick or USB stick.

By means of an e-mail or an SMS, the user can obtain from the system control center the information that an update can be downloaded, whereupon the user has the update transmitted to his storage medium from the system control center.

In line with a further exemplary embodiment of the invention, the update unit is designed to retrieve a restricted update from the system control center. This retrieval can be triggered by the user or can take place automatically at regular intervals.

In line with a further exemplary embodiment of the invention, the update unit is designed to produce a profile of a typical area of movement of the vehicle, wherein the update unit is also designed to transmit data to the system control center which correspond to the typical area of movement.

If a route is input which does not match the normal journey and is also not covered by the typical area of movement of the vehicle, the need for an update for this route is checked. One reason for such an "unusual" route might be a vacation trip, a business trip, etc.

In line with a further exemplary embodiment of the invention, an update system for a vehicle for updating a navigation map is specified which has an update unit as described above and also a system control center for transmitting the restricted update to the navigation unit.

By way of example, the system control center is an external, central server which is connected to a data network, such as the Internet.

In line with a further exemplary embodiment of the invention, the system control center is in the form of a central server system which is arranged outside of the vehicle and which communicates with the navigation unit via a wireless communication network.

In line with a further exemplary embodiment of the invention, the system control center is designed to cyclically check the actually required portion of the map for changes.

The system thus checks the selected route or the selected routes at regular intervals for changes in the actually required portion of the map and provides an update if a particular degree of change is established.

In this way, it is possible to prevent an update from being provided even if there are only insignificant changes in the actually required portion of the map. In this way, the volume of data to be transmitted can be reduced further.

In line with a further exemplary embodiment of the invention, the threshold value which, when exceeded, prompts an update to be provided can be preset by the user. The user is thus able to control how often and under what circumstances he wishes to receive an update.

In line with a further exemplary embodiment of the invention, the system control center is designed to initiate the retrieval of the restricted update.

If the system control center establishes that the changes in the map material exceed a certain extent (threshold value), for example, the user is asked whether he wants an update. The user is thus able to choose to reject such an update in order to further reduce the volume of data to be transmitted.

Similarly, the user is provided with the option of retrieving an update spontaneously without thus requiring a threshold value for changes to be exceeded.

In line with a further exemplary embodiment of the invention, the system control center stores a complete map, wherein the system control center is designed to produce and transmit updates for the map.

All of the map material is managed in the system control center and regularly brought up to date. In this context, the system control center is designed such that it performs filtering on the basis of whether the changes to the map are important enough for an update to be initiated.

In line with a further exemplary embodiment of the invention, a method for updating a digital map for a vehicle is specified in which an actually required portion of the map is ascertained proactively by an update unit. In addition, the actually required portion of the map is cyclically checked for changes, and the restricted update, which relates to the actual required portion of the map, is transmitted to the update unit by a system control center. The restricted update for the map is received by the update unit.

The restricted update can be transmitted directly from the system control center to the update unit, for example via a wireless communication link. It is also possible for the restricted update to be transmitted from the system control center to a PC and then transferred from there to a portable storage medium. The storage medium can then be connected to the update unit in order to install the restricted update. It is also possible for the storage medium to communicate with the communication unit via a wireless connection, for example Bluetooth.

In line with a further exemplary embodiment, a computer program product is specified which, when executed on a processor, instructs the processor to proactively ascertain an actually required portion of a digital map for a vehicle, to receive a restricted update for the map which relates to the actually required portion of the map, and to update the map on the basis of the restricted update.

In line with a further exemplary embodiment of the invention, a computer-readable medium is also specified which stores a computer program product which, when executed on a processor, instructs the processor to perform the steps described above.

A fundamental consideration of the invention is that an update for the map is required only for particular subregions of the digital map which are actually used for travel or which are taken into account when planning a travel route. These particular subregions are ascertained proactively in this case. In this way, it is possible to reduce the volume of data for such an update.

In addition, the time for such an update can be set to a favorable time.

BRIEF DESCRIPTION OF THE DRAWINGS

The invention is best understood from the following detailed description when read in connection with the accompanying drawings. Included in the drawings is the following features.

Figure 1:
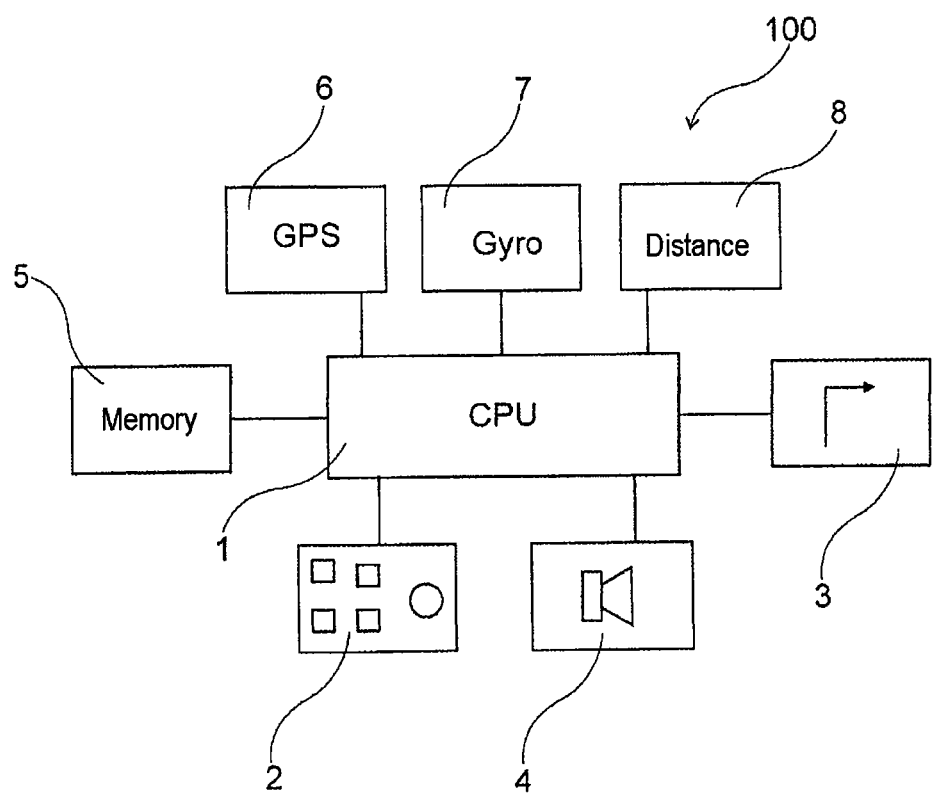
FIG. 1 shows a schematic illustration of components of a navigation unit based on an exemplary embodiment of the invention.

The illustrations in the Figures are schematic and not to scale.

In the description of the Figures which follows, the same reference numerals are used for the same or similar elements.

DETAILED DESCRIPTION OF THE PREFERRED EMBODIMENTS

FIG. 1 shows a schematic illustration of components of an update unit in the form of a navigation unit based on an exemplary embodiment of the invention. The navigation unit 100 is installed in a vehicle and is used for updating a digital navigation map. The navigation unit 100 has a computation unit 1 which also contains the memory elements (RAM/ROM) required for its operation. The computation unit 1 has an input unit 2 connected to it. The input unit 2 can be used to make various settings on the navigation system and to select a destination and possibly also the location. In this case, the destination can be input, by way of example, by inputting the full name of the destination or else by selecting from a list which is shown on a visual output unit, such as a monitor 3. The monitor 3 is also used to output the routing information. Furthermore, the routing information can also be output via an audible output unit 4. Output via an audible output unit 4 has the advantage that the driver is less distracted from what is currently happening in the traffic. A memory element 5 which is connected to the central computation unit 1 stores the map data in the form of data records. By way of example, the memory element 5 also stores additional information about traffic restrictions and the like in association with the data records.

For the purpose of determining the current vehicle position, the navigation unit 100 has a GPS receiver 6 which is designed to receive navigation signals from GPS satellites. Naturally, the navigation unit may also be deigned for other satellite navigation systems. However, since the GPS signals cannot always be received in city centers, for example, the navigation unit also has a direction sensor 7, a distance sensor 8 and a steering wheel angle sensor for the purpose of performing compound navigation. The signals from the GPS receiver, from the distance sensor and from the direction sensor are processed in the central computation unit. The vehicle position ascertained from said signals is aligned with the road maps using known map matching. Finally, the routing information obtained in this manner is output via the monitor 3.

By way of example, the map unit may be integrated in the computer unit 1 and/or also in the memory 5, however. In addition, a communication unit is provided (see reference symbol 303 in FIG. 3).

Figure 2:
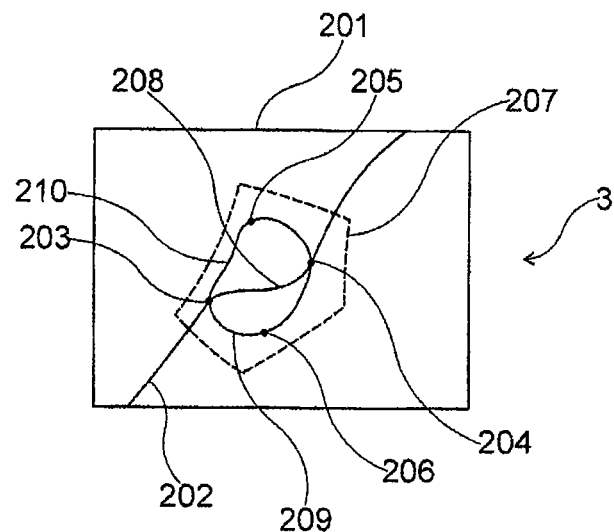
FIG. 2 shows a schematic illustration of a map detail based on an exemplary embodiment of the invention.

FIG. 2 shows a schematic illustration of a map section, as is output via the monitor 3, for example.

During an update, it is possible to interchange not all of the maps but rather only the affected data. To this end, the maps are split into a large number of small tiles, for example. For an update, only those tiles in which there have been changes since the last update are transmitted to the terminal and interchanged.

A central server sends the map data to the vehicle during the journey. As soon as a new map region is required, the server automatically delivers said region to the vehicle system.

This update mode is called "Map On Demand" mode.

In order for this method to work, constant or at least regular communication between vehicle system and external server is required.

Alternatively or in addition, the map update can be performed proactively without this requiring a connection in the form of a constant or at least regular network connection between the server and the navigation unit integrated in the vehicle.

The map section 201 in FIG. 2 shows a selected travel route or journey route 202 which connects a starting location 203 and a destination 204. By way of example, the starting location 203 is Wiesbaden and the destination 204 is Frankfurt, for example. By way of example, the driver has specified this commute on the internet page of his vehicle manufacturer and has provided it with the times 7:30 hours and 17:00 hours. The system checks the typical route from Frankfurt to Wiesbaden (direct connecting line 208 between Frankfurt 204 and Wiesbaden 203), diversion routes (for example the route 210 via the place 205), road works, typical queues at this time and the alternative routes (such as the route 209 via the place 206). Updates for these routes can be provided each morning. As soon as the driver starts his vehicle in the morning, a GSM connection to the central system is set up, and the update is downloaded and installed.

The box 207 denotes the actually required portion of the map for the Wiesbaden-Frankfurt commute.

By way of example, the check on the route always involves the actual route and also official diversion routes, typical alternative routes and routes in the immediate surroundings of the planned route being taken into account. In addition, it is also possible to include road works, queues (current and/or experience), speed restrictions, weather information, hazard warnings and other features in the ascertainment of the route which is to be examined, these able to be communicated by means of TMC.

Figure 3:
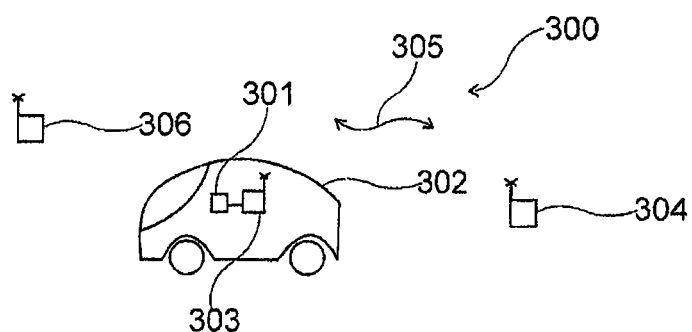
FIG. 3 shows a schematic illustration of a navigation system based on an exemplary embodiment of the invention.

FIG. 3 shows a schematic illustration of an overall system (navigation system) based on an exemplary embodiment of the invention. The overall system 300 comprises a map unit 301 in the vehicle 302, a communication unit 303 in the vehicle and a system control center 304 on which the current version of the complete map is available.

The system control center 304 compiles the updates and transmits the updates to the relevant communication unit 303 or to an intermediate addressee 306, such as the PC of a user.

The system control center 304 is able to communicate with many different communication units (that is to say with many different navigation units) and provide each individual navigation unit with an individual update if such an update is required.

By way of example, the communication between the system control center 304 and the communication unit 100 takes place wirelessly via a radio link 305 for a communication network. By way of example, this is a mobile radio network or else data links using short-range communication apparatuses, such as Bluetooth.

The communication unit 303 may also be designed to receive e-mails with a file attachment or other electronic attachments. In addition, the communication unit may be designed to perform Internet-protocol (IP)-based communication with corresponding data interchange, for example in order to obtain updated data for the digital map from a personalized internet page using a download mechanism.

By way of example, the communication unit 303 has a GSM module or a UMTS module or another radio module. The communication unit is incorporated in the navigation unit. It is also possible for the communication unit and the map unit to be connected to one another by means of a short-range communication link, for example by Bluetooth.

If the update is provided using e-mail with a file attachment or using a personalized web page with a download option, the communication unit contains a means of transmitting the file to the vehicle using a USB stick, for example, or another portable storage medium.

The transmission by GSM/UMTS/WLAN/WiMax involves setup of communication with the system control center whenever a journey starts, in order to check for updates and to load them into the vehicle.

By way of example, an update comprises changes in the route guidance, new or changed points of interest (POIs), or else details of road works. An update may therefore comprise all alterations which can influence the road traffic.

Figure 4:
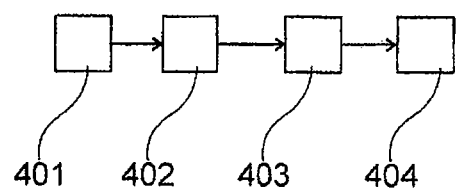
FIG. 4 shows a flowchart for a method based on an exemplary embodiment of the invention.

FIG. 4 shows a flowchart for a method for updating a navigation map for a vehicle. In step 401, an actually required portion of the map is proactively ascertained by a navigation unit. In step 402, the actually required portion of the map is cyclically checked for changes, and in step 403, the restricted update, which relates to the actually required portion of the map, is transmitted to the navigation unit by a system control center. This update is received by the navigation unit in step 404.

In addition, it should be pointed out that "comprising" and "having" do not exclude other elements or steps, and "a" or "an" does not exclude a large number. Furthermore, it should be pointed out that features or steps which have been described with reference to one of the above exemplary embodiments can also be used in combination with other features or steps from other exemplary embodiments described above.

The invention claimed is:

1. An update unit for a vehicle for updating a digital map, said update unit comprising:
   a map unit with a digital map for displaying a travel route on the map;
   wherein the update unit is configured to request an update of a required portion of the map from a system control center; and
   wherein the update unit is also configured to:
      receive the requested update of the required portion of the map when the system control center determines that the required portion of the map should be updated based on a comparison between the requested portion and a stored portion stored at the system control center, the map unit displaying the update of the required portion of the map,
   wherein when the system control center determines that the required portion of the map should not be updated based on the comparison between the requested portion and the stored portion stored at the system control center, the update unit does not receive the requested update, and the map unit displays the required portion of the map,
   wherein the system control center is also configured to initiate retrieval of the update of the required portion of the map without receiving a request from the update unit of the vehicle, wherein the system control center is configured to cyclically check the required portion of the map for changes, and wherein the system control center is also configured to establish a degree for the changes in the required portion of the map.

2. The update unit as claimed in claim 1, wherein the required portion of the map is ascertained on the basis of a user input.

3. The update unit as claimed in claim 1, wherein the required portion of the map is ascertained on the basis of detection of a traveled journey route.

4. The update unit as claimed in claim 1 further comprising a communication unit for communication with a system control center.

5. The update unit as claimed in claim 4, wherein the update unit is configured to retrieve the restricted update from the system control center.

6. The update unit as claimed in claim 5,
   wherein the update unit is configured to produce a profile of a typical area of movement of the vehicle;
   wherein the update unit is also configured to transmit data to the system control center which correspond to the typical area of movement.

7. The update unit in claim 1,
   wherein the system control center transmits the requested update to the update unit.

8. The update unit as claimed in claim 7,
   wherein the system control center is a central server system which is arranged outside of the vehicle and which communicates with the update unit via a wireless communication network.

9. The update unit as claimed in claim 7, wherein the system control center stores a complete map; and wherein the system control center is configured to produce and to transmit updates for the map.

10. A method for updating a digital map for a vehicle, said method comprising the following steps:
    requesting, by an update unit, an update of a required portion of the map from a system control center;
    cyclically checking the required portion of the map for changes;
    transmitting the requested update, which relates to the required portion of the map, to the update unit by the system control center; and
    receiving, by the update unit, the requested update of the required portion of the map when the system control center determines that the required portion of the map should be updated based on changes between the requested portion and a stored portion stored at the system control center, the map unit displaying the update of the required portion of the map,
       wherein when the system control center determines that the required portion of the map should not be updated based on changes between the requested portion and the stored portion stored at the system control center, the update unit does not receive the requested update, and the map unit displays the required portion of the map,
    wherein the system control center is also configured to initiate retrieval of the update of the required portion of the map without receiving a request from the update unit of the vehicle, wherein the system control center is configured to cyclically check the required portion of the map for changes, and wherein the system control center is also configured to establish a degree for the changes in the required portion of the map.

11. A computer program product stored on a non-transitory computer readable storage medium which, when executed on a processor, instructs the processor to perform the following steps:

requesting an update of a required portion of a digital map for a vehicle from a system control center; and receiving the requested update of the required portion of the map when the system control center determines that the required portion of the map should be updated based on a comparison between the requested portion and a stored portion stored at the system control center, and displaying the update of the required portion of the map, wherein when the system control center determines that the required portion of the map should not be updated based on the comparison between the requested portion and the stored portion stored at the system control center, the requested update is not received, and the required portion of the map is displayed, wherein the system control center is also configured to initiate retrieval of the update of the required portion of the map without receiving a request from the update unit of the vehicle, wherein the system control center is configured to cyclically check the required portion of the map for changes, and wherein the system control center is also configured to establish a degree for the changes in the required portion of the map.

12. A non-transitory computer-readable medium which stores a computer program product which, when executed on a processor, instructs the processor to perform the following steps:

requesting an update of a required portion of a digital map for a vehicle from a system control center; and receiving the requested update of the required portion of the map when the system control center determines that the required portion of the map should be updated based on a comparison between the requested portion and a stored portion stored at the system control center, and displaying the update of the required portion of the map, wherein when the system control center determines that the required portion of the map should not be updated based on the comparison between the requested portion and the stored portion stored at the system control center, the requested update is not received, and required portion of the map is displayed, wherein the system control center is also configured to initiate retrieval of the update of the required portion of the map without receiving a request from the update unit of the vehicle, wherein the system control center is configured to cyclically check the required portion of the map for changes, and wherein the system control center is also configured to establish a degree for the changes in the required portion of the map.

* * * * *